J. Danner,

Washing Machine,

N° 48,375. Patented June 27, 1865.

Attest:

Inventor:

UNITED STATES PATENT OFFICE.

JOHN DANNER, OF CANTON, OHIO.

WASHING-MACHINE.

Specification forming part of Letters Patent No. 48,375, dated June 27, 1865.

*To all whom it may concern:*

Be it known that I, JOHN DANNER, of Canton, in the county of Stark and State of Ohio, have invented a new and useful Improvement in the Construction of Cylinders and Rolls for Washing-Machines; and I do hereby declare the following to be a full, clear, and exact description of the construction and operation thereof, reference being had to the accompanying drawings, making a part of this specification, in which—

Figure 1:
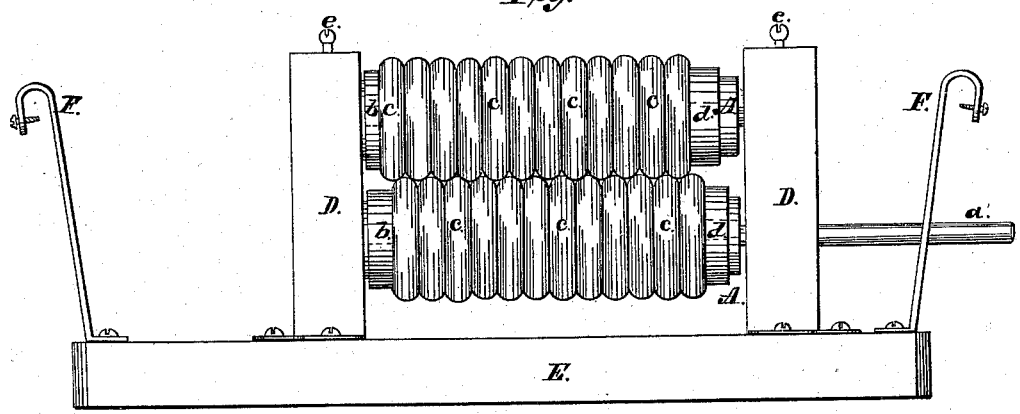
Figure 2:
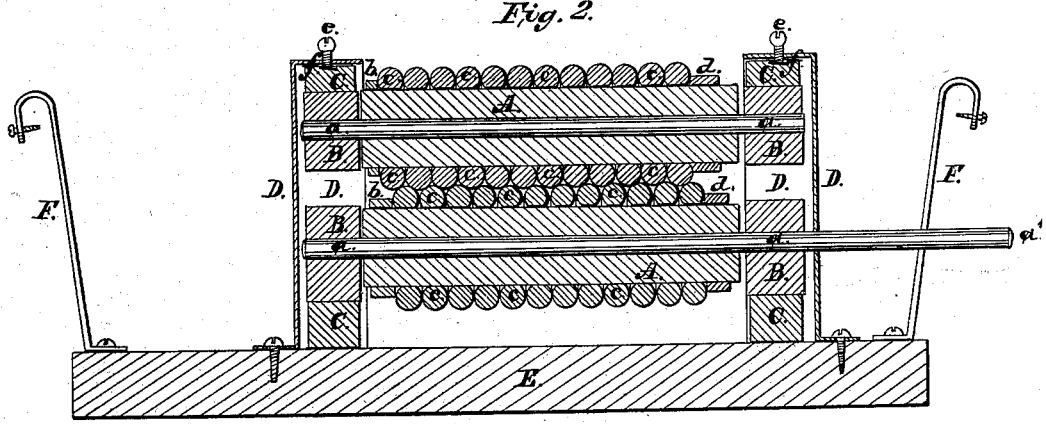
Figure 2:
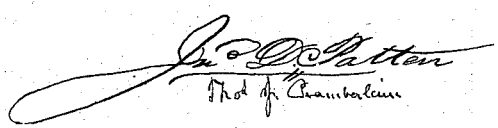
Figure 2:
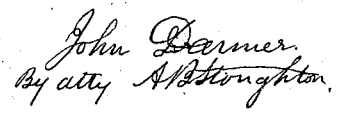

Figure 1 represents a side view of a pair of the rolls in question applied to what is termed a "tub washing-machine," the invention being equally applicable to any other of the stand or frame machines. Fig. 2 represents a longitudinal vertical section through the rolls and their supporting-frame.

Similar letters of reference, where they occur in the separate figures, denote like parts in both.

I am aware that rolls have been made of rings or disks of felt cloth placed in juxtaposition upon a shaft or core; but these cloth disks do not make a good washing-surface because of the smooth and soft character of the material. Of course, I lay no claim to any such rolls.

My invention consists in making washing-machine rolls by covering a shaft or core-piece with india-rubber rings of cylindrical or other cross-sectional areas or forms, so as to make a good rubbing or washing surface, as will be explained.

To enable others skilled in the art to make and use my invention, I will proceed to describe the same with reference to the drawings.

I take a shaft or core-piece, A, of wood or any other suitable material, furnished with journals of metal or of their own material, $a$, so that they may be turned by a crank or other usual machinery, and, having arranged upon said core-piece a head, $b$, I proceed to slip onto it a series of rubber rings, $c$, until it is full, and then place a collar, nut, or washer, $d$, upon the end of the core-piece, by which the rings are forced up tightly against each other and held in place.

It is not material what the external form or shape of the core-piece may be. I have represented it as cylindrical; and it may be slightly grooved circumferentially to form seats for the rings, if desirable.

The rings $c$, as I have shown them, when cut as in the section, Fig. 2, have a circular form; but they may be of a half-circular shape, or of a D or angular form, or, indeed, of any sectional form that will make a good rubbing-surface upon the rolls; and these forms may be given to the rings when they are made and vulcanized; or they may, from their natural elasticity and compressibility, be compressed or stretched into the desired form by the shape of the core-piece upon which they are placed.

B B are the pillow-blocks or side pieces for supporting the journals of the rolls, and these supports may have india-rubber (which I prefer) or other springs, C C, to hold them together, and yet allow them to yield to any undue pressure from the varying thicknesses of the material to be passed between them.

D D are pieces for holding the supporting-blocks B in place, and they may have a set-screw, $e$, and follower $f$, for regulating the pressure between the rolls.

The base-piece E may have suspension rods or bars F upon it to support the apparatus in an ordinary washing-tub, though the rolls may as appropriately be used in a stand or other framed machine.

The suspending rods or bars F, when used, may be adjustable, so as to apply the apparatus to any sized tub or to various depths of water in the tub.

The journal $a'$ is extended so as to receive a crank or any other well-known device for turning it, its friction with the adjacent roll turning the other one; or the crank or other turning device may be applied to the upper instead of to the under roll.

Rolls made of such rubber rings as mentioned have a sufficiently hard, irregular, but yielding surface to rub or wash the clothes well without injuring them; and should any one or more of the rings give way or become injured, it may be readily taken off and a new one put in its place.

Having thus fully described the nature of my invention, what I claim therein as new, and desire to secure by Letters Patent, is—

A roll or cylinder for washing-machines, the perimeter of which is covered with india-rubber rings, so as to make a washing or rubbing surface, substantially as herein described and represented.

JOHN DANNER.

Witnesses:
PETER SHIMP,
C. D. WOLF.